US009152899B2

(12) United States Patent
Marquardt et al.

(10) Patent No.: US 9,152,899 B2
(45) Date of Patent: *Oct. 6, 2015

(54) SECURE, SERVER-LESS PRINT RELEASE

(71) Applicant: Lexmark International, Inc., Lexington, KY (US)

(72) Inventors: Christian Wilhelm Marquardt, Gelsenkirchen (DE); Christian Feige, Gevelsberg (DE)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/136,539

(22) Filed: Dec. 20, 2013

(65) Prior Publication Data

US 2015/0178608 A1 Jun. 25, 2015

(51) Int. Cl.
*G06F 15/00* (2006.01)
*G06K 1/00* (2006.01)
*G06K 15/00* (2006.01)
*G06F 3/12* (2006.01)

(52) U.S. Cl.
CPC .......... *G06K 15/4095* (2013.01); *G06F 3/1222* (2013.01); *G06F 3/1238* (2013.01); *G06F 3/1267* (2013.01)

(58) Field of Classification Search
CPC . G06K 15/4095; G06F 3/1222; G06F 3/1238; G06F 3/1267
USPC ......................................... 358/1.1, 1.14, 1.15
See application file for complete search history.

(56) References Cited

U.S. PATENT DOCUMENTS 7,215,434 B1 * 5/2007 Janse et al. ................... 358/1.15
2012/0069386 A1 * 3/2012 St. Laurent et al. ......... 358/1.15

* cited by examiner

*Primary Examiner* — Douglas Tran

(57) ABSTRACT

A print release environment includes a client computing device, an imaging device and an active directory. The client stores an imaging job on a local hard disk. The client registers itself with the active directory indicating an existence of the job. Upon a user logging in to the imaging device to retrieve an imaged media corresponding to the imaging job, the imaging device queries the active directory for possible clients. The imaging device contacts client(s) and retrieves a list of jobs available to the user. The user selects their job and the client releases it direct to the imaging device. The client deletes the imaging job upon successful imaging of the media and undoes its registration with the active directory, unless further imaging jobs exist for the user. Encryption techniques are contemplated to secure the data of the imaging job end-to-end from the client to the imaging device.

20 Claims, 8 Drawing Sheets

SECURE, SERVER-LESS PRINT RELEASE

FIELD OF THE INVENTION

The present invention relates to print release environments including clients and imaging devices. It relates further to print release absent a print server storing print jobs for users. Distributed computing environments typify the design as do encryption techniques for security.

BACKGROUND

In traditional printing environments, users send print jobs from computers, phones, tablets, etc. direct to imaging devices for printing and hard-copy pick up. In print release environments, print servers hold print jobs until later claiming by users at one of many networked imaging devices, e.g., printers, copiers, fax machines, etc. The servers not only hold print jobs from access until users authenticate themselves, but they track printing habits and enforce compliance of policy. The technique holds users accountable for imaging projects, including size, cost, quotas, etc. and prevents accidental release of hard copies to others. Managed print services (MPS) is but one popular form of print release implementation.

In an open computing concept in modern offices, users have no individual computing device dedicated to their needs and no practical way to be associated with imaging quotas. Rather, users are free to travel within offices, amongst floors, around campus, etc. and can use any computing device at their disposal. For such users it is difficult, if not impossible, for organizations to track printing habits and enforce policies. Yet, many organizations would still like a mechanism to bring users of this type under their control. Similarly, smaller organizations without servers would also like a mechanism to bring about policy control, but without incurring the costs associated with relatively expensive print-release infrastructure. As it stands, organizations can expect to purchase dozens, hundreds or thousands of print servers when executing a print release strategy for their employees, including further costs to maintain and update the servers. What is needed is a solution to enforce policy on users in a print-release manner, but without the human and capital costs associated with servers. The need extends to implementation in both small office environments and modern open concepts. Devising solutions will also add further advantages.

For example, upon a user printing a document in a traditional print release environment, the print job is spooled from the user's computer to a print server where it is cached. As many other users also have their print jobs cached at a proximate time, at the same place, the print server represents a source of failure that singularly affects many print jobs and can disproportionately disrupt productivity of many users at any given time. Also, as users claim their jobs from myriads of imaging devices connected to the print server, high volumes of network traffic can exist simultaneously and server loading of multiple imaging jobs at any given time makes possible large patterns of network traffic that can slow processing to individual users. What is needed is a solution that decentralizes the risk of failure in lieu of more even-handed distribution and minimizes potential bottlenecks of network traffic. That the subject matter imaged on media by imaging devices may implicate sensitive, confidential or secret information, any solutions should further contemplate high security for imaging and uses of encryption/decryption. Additional benefits and alternatives are also sought when devising solutions.

SUMMARY

The above-mentioned and other problems are solved by methods and apparatus for secure, server-less print release environments. A server-less print release environment includes a client computing device, an imaging device and an active directory. The client stores an imaging job on a local hard drive. The client registers itself with the active directory indicating the existence of imaging jobs for a user. Upon the user logging in to the imaging device to retrieve an imaged media corresponding to the imaging job, the imaging device queries the active directory for possible client(s) having jobs for the user. The imaging device contacts the client(s) and retrieves a list of imaging jobs available to the user. The user selects their job and the client releases it direct to the imaging device. Print and application servers are avoided thereby saving capital and computing infrastructure. Calls from customers to help desks are simplified as the environment now has fewer hardware components, thus making easier troubleshooting of defects. Worker support from the help desk is also minimized as there are fewer calls.

Upon successful imaging of the media, the imaging device notifies the client and the client deletes the job(s) from its disk. The client undoes its registration with the active directory if no more imaging jobs exist for the user. Otherwise, the client remains registered and available to the user for obtaining further imaged media corresponding to the remaining jobs.

Encryption of the imaging jobs can occur on the client with decryption keys passed to the imaging device for decrypting at the time of imaging after the user selects their job. Secure computing connections between the client and imaging device can also serve to secure the underlying data of the imaging job. RFID and Kerberos systems, username/password, and identification cards for authentication are also noted to provide additional security. Other embodiments include arrangements between devices, including scalability of additional clients and imaging devices, and methods of operation, to name a few.

These and other embodiments are set forth in the description below. Their advantages and features will become readily apparent to skilled artisans. The claims set forth particular limitations.

DETAILED DESCRIPTION OF THE ILLUSTRATED EMBODIMENTS

In the following detailed description, reference is made to the accompanying drawings where like numerals represent like details. The embodiments are described in sufficient detail to enable those skilled in the art to practice the invention. It is to be understood that other embodiments may be utilized and that changes may be made without departing from the scope of the invention. The following detailed description, therefore, is not to be taken in a limiting sense and the scope of the invention is defined only by the appended claims and their equivalents. In accordance with the features of the invention, methods and apparatus teach secure, serverless print release environments.

Figure 1:
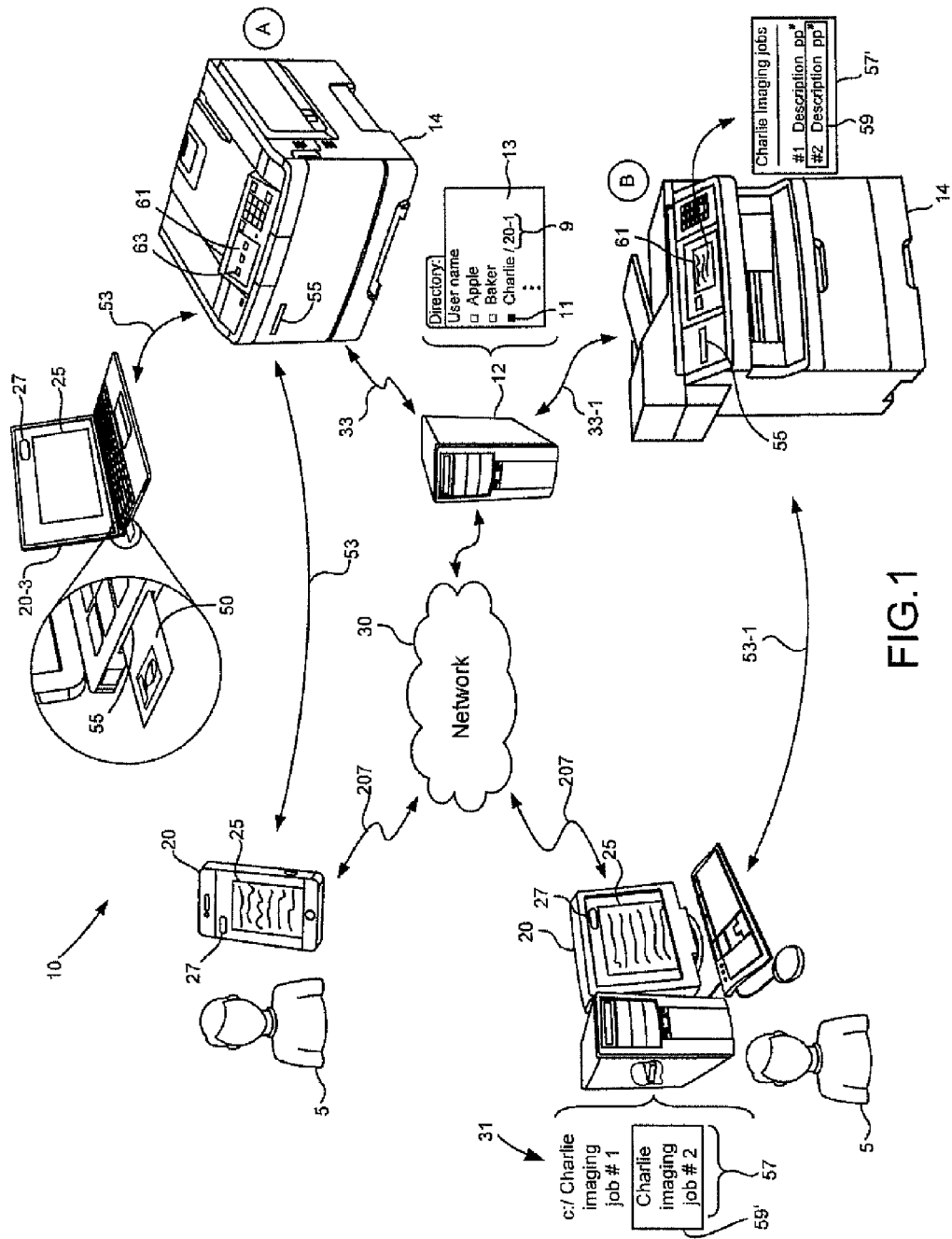
FIG. 1 is a diagrammatic view of a print release computing system environment according to embodiments of the invention.

With reference to FIG. 1, a print release computing environment 10 includes an active computing directory 12, one or more client computing devices 20 and one or more imaging devices 14. Users 5 interact with client computing devices 20 such as smart phones, laptop computers, desktop computers, tablets, iPads, etc. They display and engage items 25 on the computing devices, such as documents, images, web pages, screen shots, messages, files, photos, etc. The items are in need of imaging operations, such as printing, scanning, copying, faxing, scanning-to-email, etc. Users seek to obtain imaged media from the imaging devices corresponding to the items 25. The imaging devices include, but are not limited to, printers, copiers, fax machines, all-in-one machines, multifunction printers (MFPs), etc. The imaging devices are any of a variety, but labeled as Printer (A) and MFP (B) to illustrate various examples of operation, including controllers that are configured to operate in a programmed fashion. The active directory is a computing device, such as a server, but may typify other devices such as a storage volume, general purpose computer, a controller, database, etc. The directory defines a list 13 of clients, users, employees, etc. in an entity available to participate in the print release environment. A network 30 (e.g., LAN/WAN/etc.) connects together the directory 13, clients 20, and imaging devices 14. The network includes a variety of software to send and receive packets of information and hardware, such as routers, servers, switches, general or special purpose computers, transmission and relay towers, satellites, fiber optics, phone lines, cables, etc. The connections are wired and wireless communications between a few or many such devices in an internet, intranet or other surrounding. The network connects together the devices in any configuration, not just the configuration shown.

Figure 2:
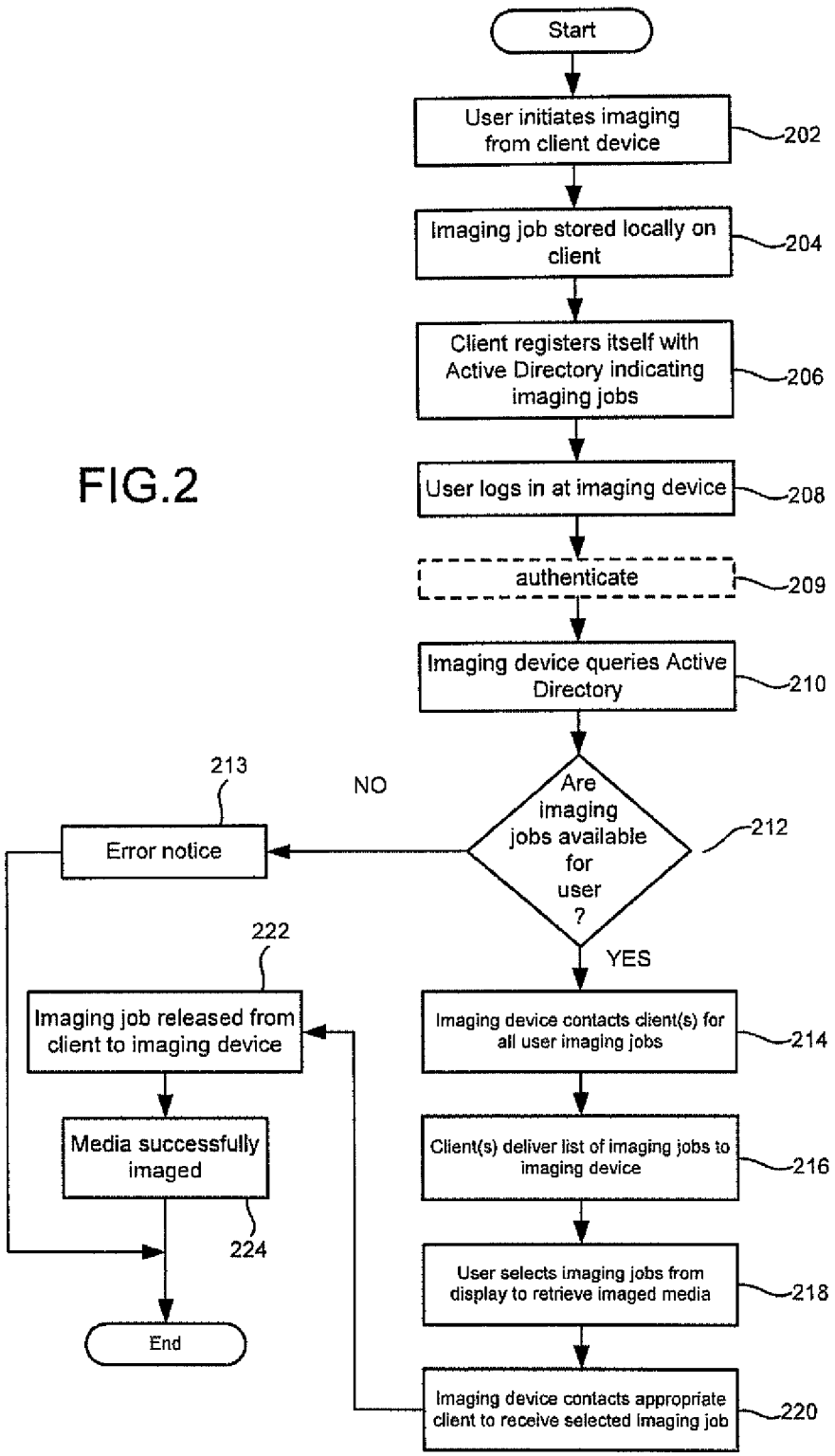
FIGS. 2-4 are flow charts for print release, including release without print servers.

With additional reference to FIG. 2, users initiate imaging of items, 202, on client devices by selecting an indicia 27, such as a printer icon or a button labeled "print," "fax," etc., as is familiar. The client bundles together an "imaging job," which includes the requisite details of the item being imaged along with metadata, and packages them into an appropriate printer language for the imaging devices, such as Printer Command Language (PCL), Postscript, etc., as is also familiar. Instead of forwarding the imaging job to a print server, as occurs in a traditional print release environment, or direct to an imaging device, as with direct printing, the client spools the imaging job and saves it locally 204, such as on an exterior or integrated hard disk noted at 31, C:/.

The client 20 next registers itself with the active directory 12, if not having earlier done so, to indicate the existence of an imaging job for the user, 206. In the example given, the directory defines a list 13 of users of the print release environment 10, i.e., names Apple, Baker, and Charlie. (The list is a computer construct, but indicated herein as an alphabetical listing and can be arranged in any fashion suitable for the directory.) The list also includes a feature 11, such as a check box, flag, etc. for indicating or not whether any imaging jobs exist for the user. If so, the location of the client 9 is noted for the user. As seen, Charlie has imaging jobs available at client computing device 20-1, while Apple and Baker, registered as users in the environment, have no imaging jobs available for processing. (It should be appreciated that other imaging jobs for user Charlie could exist relative to other client computing devices, e.g., 20-2, 20-3. In such instance, those clients 20-2, 20-3 would register themselves in the directory for user Charlie, thus identifying the whereabouts of other imaging jobs.)

To obtain a hard-copy output of imaged media, the user 5 (Charlie) logs in at any imaging device 14 of their choosing, 208. The logging-in takes a variety of forms and optionally includes an instance of user authentication 209. In one embodiment, authentication comes in the form of an identification card 50 issued to a user 5 by a controlling entity of the print release environment 10. The card contains basic information corresponding to the user, such as name, position, location, contact information, etc. and control information relative to imaging jobs, such as imaging quotas, imaging policies, etc. The information is embedded in the card for extraction in a bar code, QR code, magnetic stripe, electronic smart tag, RFID tag, or the like. In two actual embodiments of usage, the card typifies RFID technology with corresponding entry of a username/password on the client or a smart card coupled with public-key infrastructure (PKI). The card 50 travels with the user and gets swiped by a reader or inserted into a communications slot 55 of the client 20 and the imaging device 14 before use of the device can take place at the client or imaging device. In this way, a user 5 can freely travel in an open computing concept and utilize any client or imaging device at their disposal, yet still be tracked in a print release environment and constrained to imaging policies issued for the user by the entity. The card can be also used in more traditional offices having client and imaging devices strictly dedicated to the user for their needs, whereby tracking of the imaging jobs of the user still get constrained by various imaging policies.

In any situation, the imaging device 14(B) has now logged in the user and initiates the workflow to get them a copy of their imaging job. At 210, the imaging device queries 33-1 the active directory to see if any imaging jobs exist for user Charlie. Upon the directory 12 noting to the imaging device 14(B) that jobs indeed exist for Charlie at 212, the imaging device at 214 contacts 53-1 the appropriate client device 20-1 for imaging jobs for Charlie. (It should be appreciated that imaging jobs for any given user may exist at any time on more than one client computing device. If so, the imaging device contacts 53 all such clients 20-1, 20-2, 20-3, to find imaging jobs for the user. To the extent no imaging jobs exist for a user, such as user Apple or Baker in list 13 of directory 12, a suitable error notice is provided to them at 213 indicating that no imaging jobs exist.)

At 216, the client 20-1 searches its local cache 31 of imaging jobs and delivers a list 57 to the imaging device 14(B) for display 57' to the user. The list includes Charlie Imaging Job #1 and Charlie Imaging Job #2, as representative. At 218, the user selects 59 the imaging job of their desire (Charlie Imaging Job #2) from the displayed list 57' in order to obtain a hard copy output corresponding to the selected imaging job. In turn, the imaging device contacts the client at 53-1 to notify the client of the imaging job selected by the user at 59 in order to receive the corresponding imaging job 59' from the client. At 222, the client 20-1 releases the selected imaging job 59' to the imaging device 14(B) where a media sheet is successfully imaged and delivered to the user (Charlie) at 224.

Figure 3:
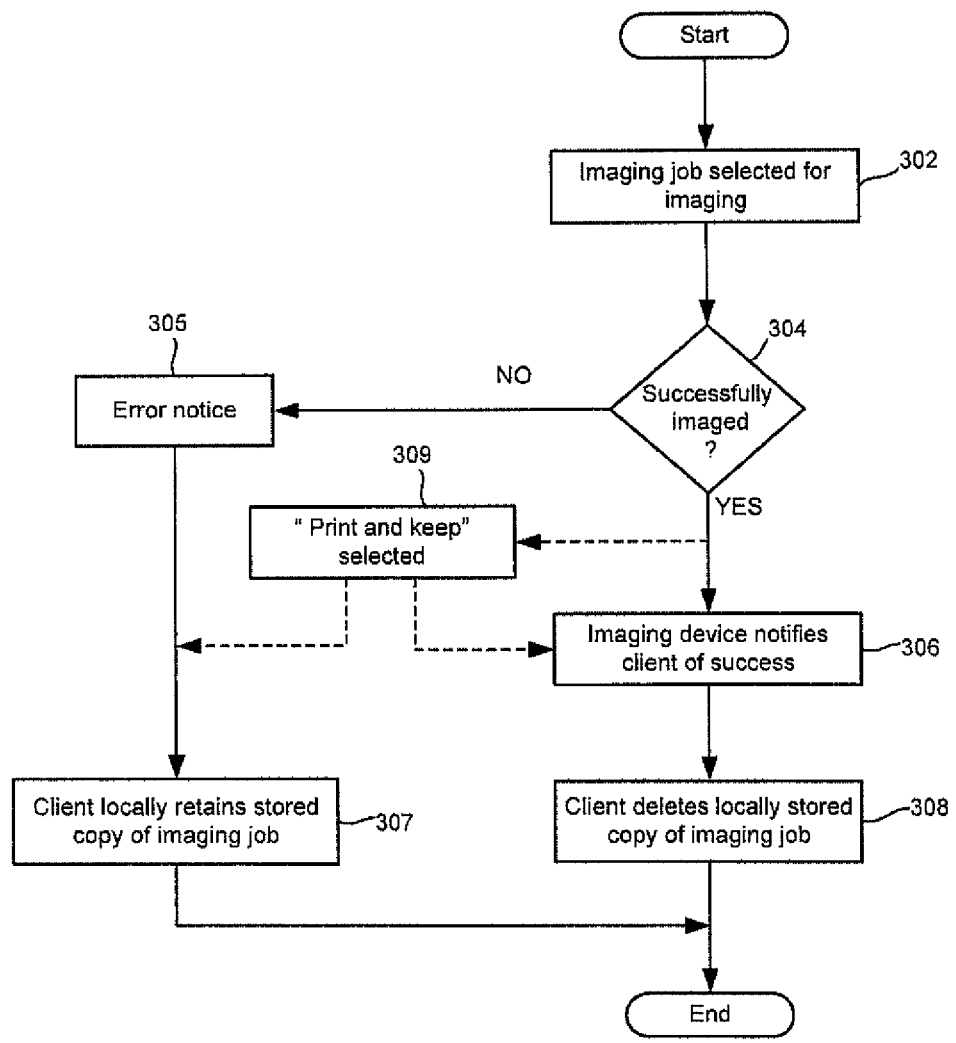

With reference to FIG. 3, it will be appreciated that an imaging job selected by the user for imaging in an imaging device at 302 may or may not be successfully imaged at 304. If not, an error notice is provided to the user at 305 along with any information to assist the user in diagnosing and correcting the error. The error may be related to the specifics of the imaging device, such as paper jam, out-of-paper condition, replace toner cartridge, etc., as is typical, or may be related to the client device and/or its interaction and release of the imaging job to the imaging device. In such instances, the error situation at 305 causes the client to keep stored its local copy of the imaging job of the user, 307, until such time as the error can be corrected and successful imaging can take place at 304. On the other hand, successful imaging of the user's imaging job at 304 causes the imaging device to notify the client of the success 306, whereby the client can delete the imaging job from their local hard disk at 308 and free up memory space. In a hybrid situation, many imaging devices in print release environments have options for users to note a desire for creating a hard copy output of their imaging job, but also for keeping or retaining the imaging job for still further imaging at a later time. It is common in these situations for the imaging device to have a display button for user-selection that reads "print and keep," or something akin thereto. If the user has selected the "print and keep," noted at 309, and successful imaging has occurred at 304, the client will still retain their copy of the imaging job on their local hard disk at 307. The imaging device may or may not also notify the client of successful imaging in such situations, such as at 306.

While the time varies for keeping the retained copy of the imaging job at 307, or for holding an imaging job at the client in situations in which the user never claims it at an imaging device, the amount of time of storage can be dictated by policy of the print release environment. By analogy to traditional print release environments having imaging jobs stored on print servers, it is not uncommon to delete stored imaging jobs based on time, such as per a number of hours, e.g., 3, 8, 12, etc. or a number of days, e.g., 1 (day), 7 (week), 30 (month) etc., and such would work equally well in a serverless print release environment. Alternatively, client computing devices may have imaging job retention/deletion policies applied relative to their storage capacities. In such situations, policies might dictate that older imaging jobs are deleted in lieu of newer imaging jobs (FIFO), that smaller imaging jobs are deleted to accommodate larger imaging jobs (or vice versa), or by any other policy appropriate for the imaging environment. There also can be a user selection for "protect" any imaging job of a user's desire or for indicating an order of imaging hierarchy, $1^{st}$, $2^{nd}$, ... $N^{th}$. In such cases, un-protected or lower-hierarchical jobs would be deleted in favor of protected or higher-hierarchical jobs. Multiple policies can also apply to a singular imaging job at any given time. Users should be free also to view their cache of imaging jobs at client devices at any time, such as making list 57, FIG. 1, available for viewing upon request.

Figure 4:
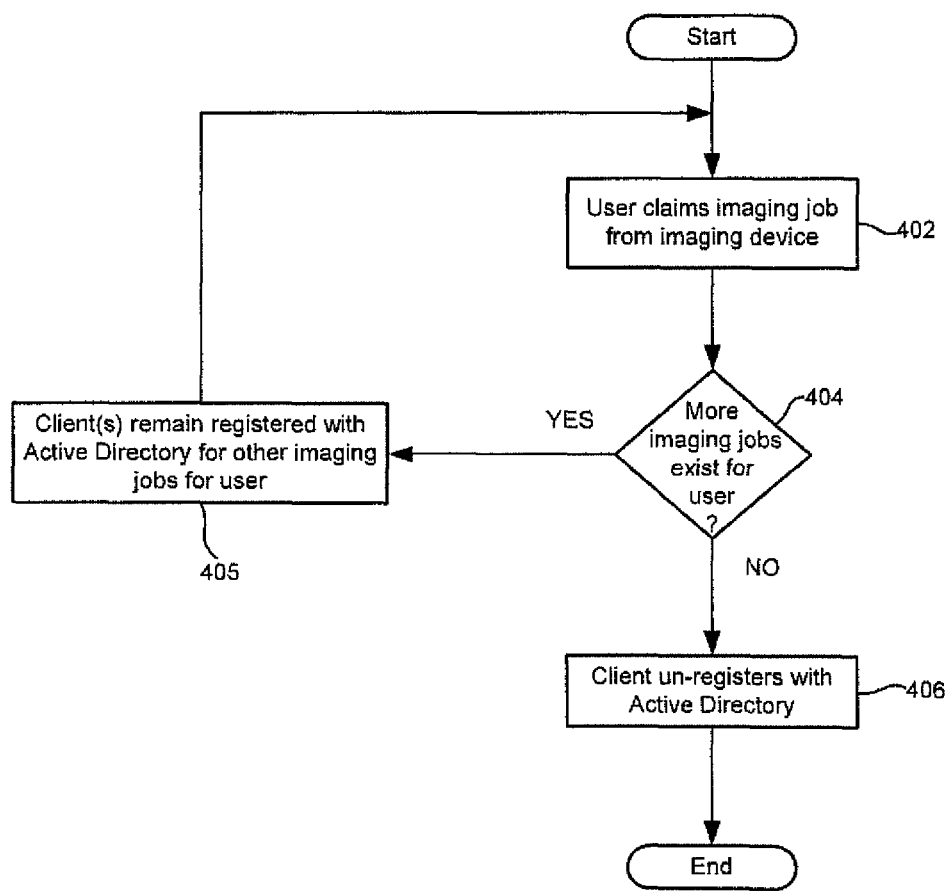

As users eventually obtain hard copies of their imaging job, reference is taken to FIG. 4 to further describe the role of the active directory in relation to additional imaging jobs after users claim their selected imaging jobs at 402. If users have additional imaging jobs available for processing at 404, i.e., Charlie Imaging Job#1 remains available for user Charlie at client 20-1 upon claiming Charlie Imaging Job#2, or upon a user initiating a "print and keep" function for a particular job, the active directory 12 remains registered for that user 405 until all such imaging jobs are eventually claimed or deleted from existence. Else, the client un-registers itself from the active directory indicating an absence of imaging jobs for that particular user 406.

It should be readily apparent now to skilled artisans that the benefits of a print release imaging environment have been obtained, but without the computing infrastructure and human and capital costs associated with print servers storing imaging jobs for users. With powerful hardware being regarded now as a commodity, it is feasible to store imaging jobs locally on client devices and transfer them on demand directly to an imaging device, including enforcement of policy on the imaging job and/or user. Advantages of this approach note a decentralized risk of failure spread amongst many client and many imaging devices, without regard to a single point of failure normally associated with a single print server acting as centralized command for many imaging jobs for many users. Network traffic overhead is also minimized upon job-claiming as users are spread amongst many imaging devices 14 in direct communication with many clients 20, thereby minimizing the potential for bottlenecks of network traffic and reducing the amounts of data transferred over networks.

Figure 5:
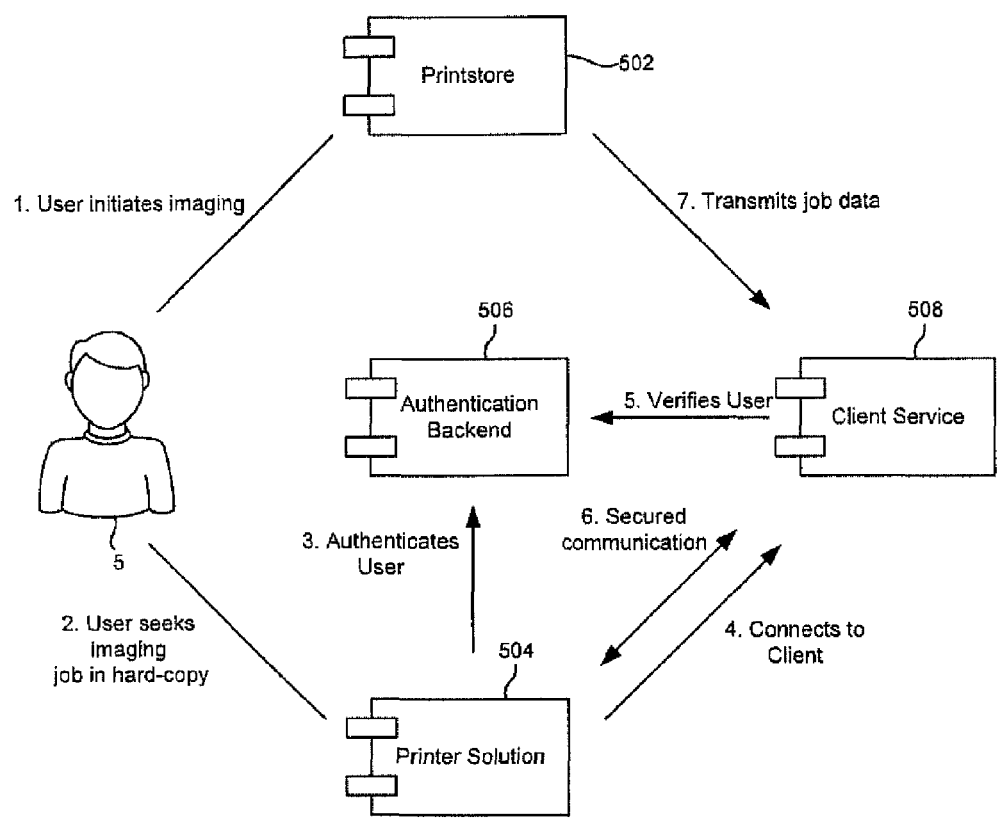
FIGS. 5-8 are flow charts detailing security features.
Figure 6:
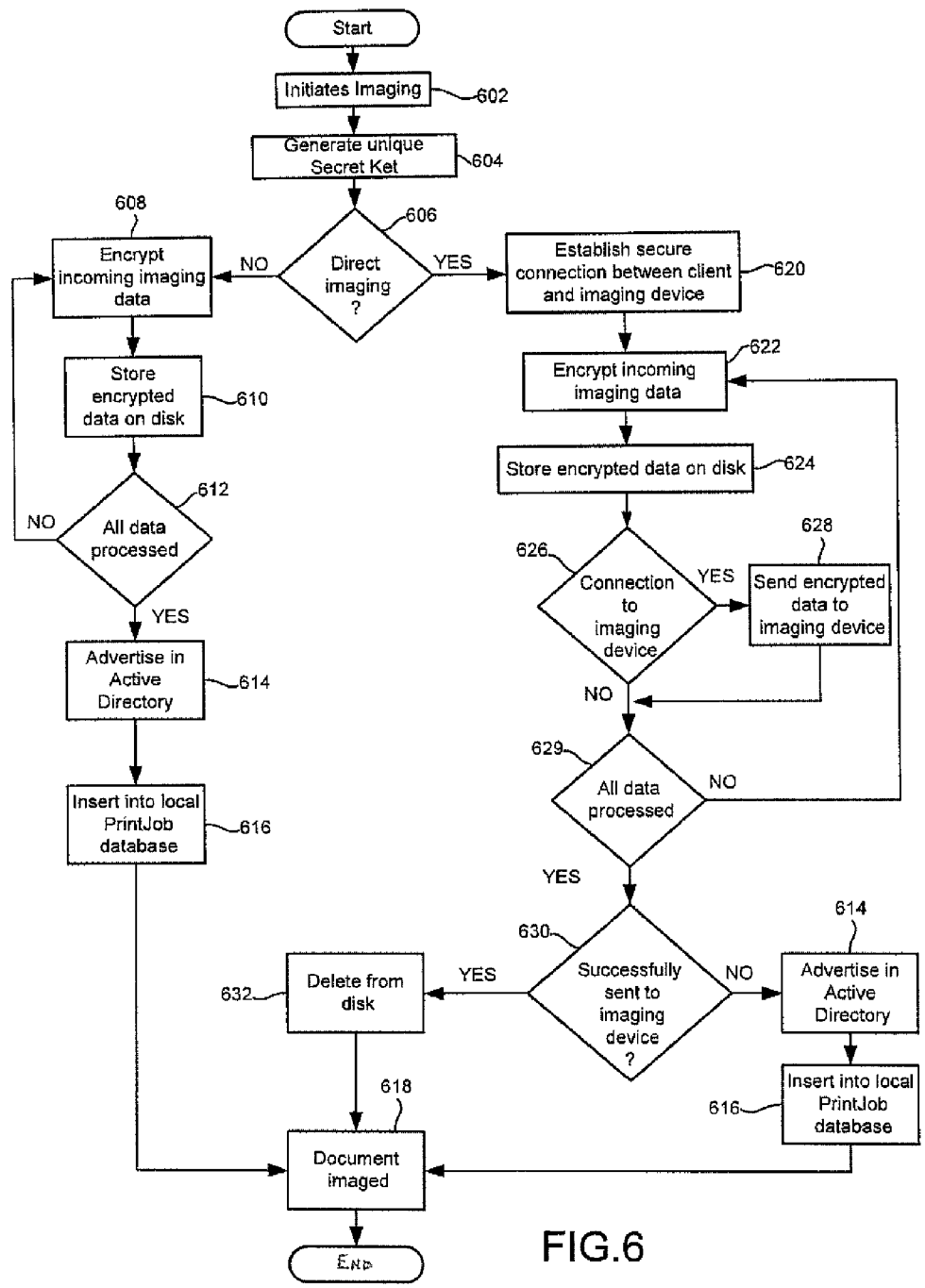
Figure 7:
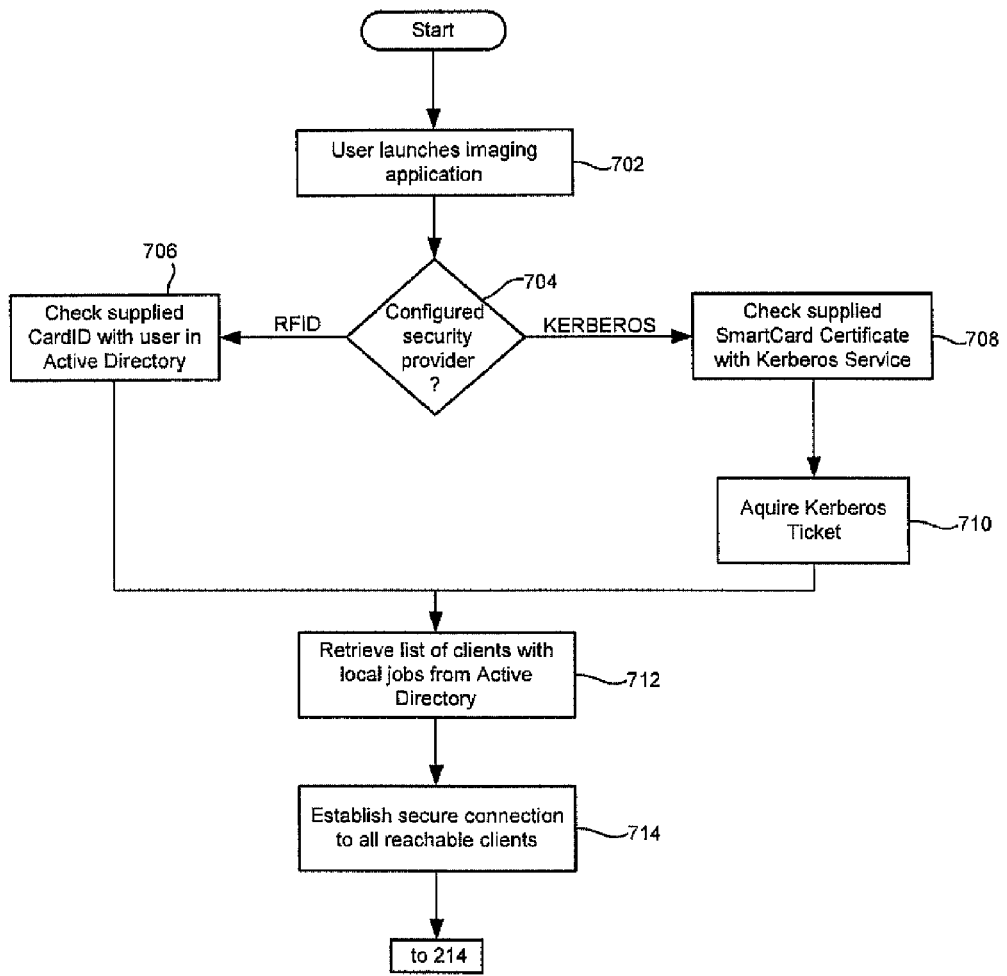
Figure 8:
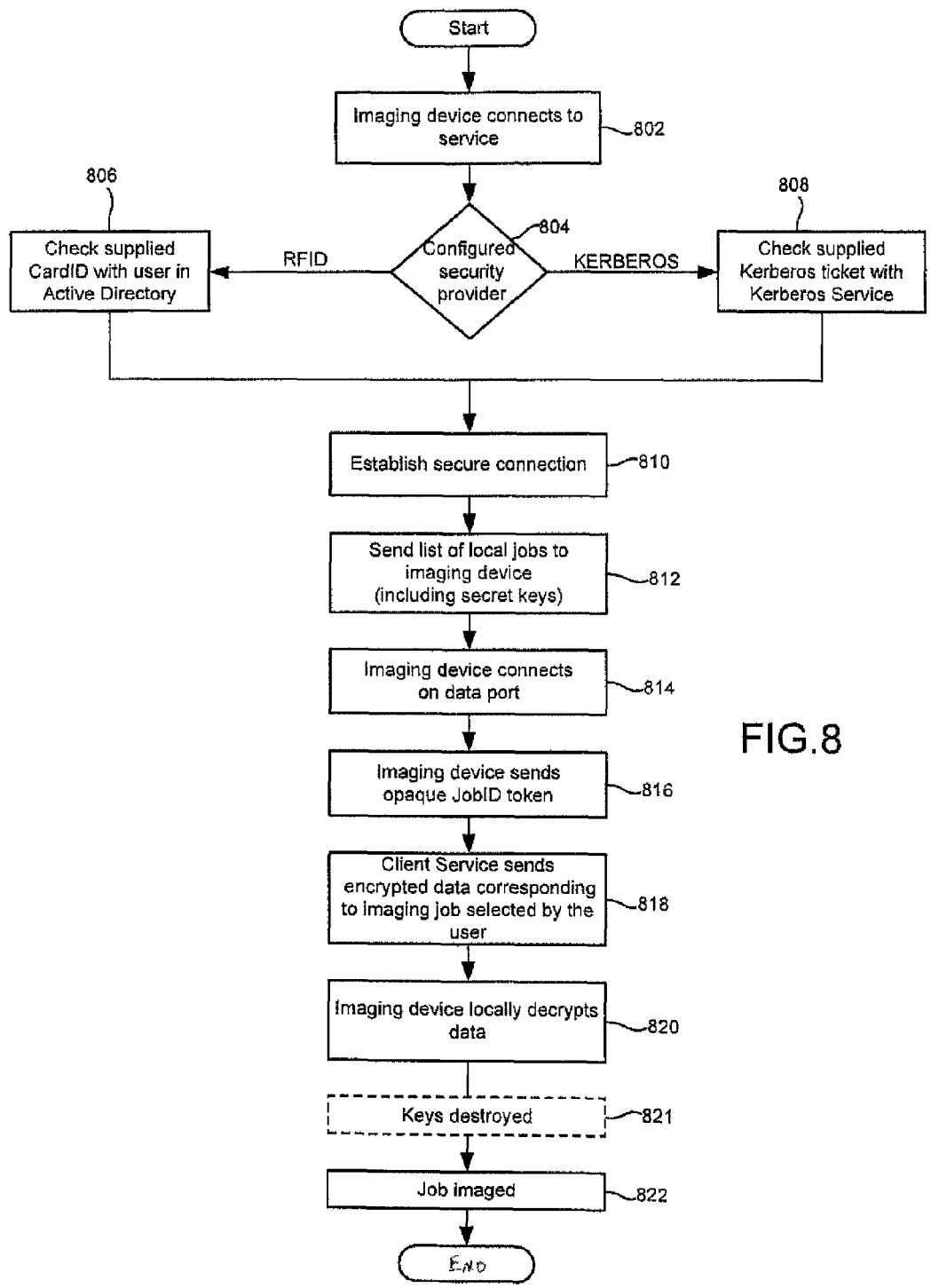

That the content or subject matter of the imaging jobs may implicate sensitive, confidential or secret information, reference is taken to FIGS. 5-8 to describe embodiments contemplating heightened security for the print release environment. FIG. 5 details a generic scenario, while FIGS. 6-8 are more detailed. With reference to FIG. 5, a user 5 initiates imaging (1.) whereupon the client computing device spools the imaging job via a custom-direct print port and encrypts it on-the-fly before storing it, encrypted, on the local disk at Printstore 502. Encryption is any of a variety, but an encryption-key algorithm, such as an Advanced Encryption Standard (AES) 256-Bit cipher is executed on the client or is undertaken with a user-specific encryption key. In turn, only the print monitor and the host service are able to access the data or contents of the imaging job.

When the user 5 seeks to obtain a hard-copy output of their imaging job, the user logs-in to the imaging device and selects their imaging job for release from the client to the imaging device (2.). During this connection between the imaging device 14 and client 20 (FIG. 1), a message-oriented control connection (4.) is established and the imaging device uses this connection to manage imaging jobs for users on the client devices. At some point in time before actually releasing the encrypted imaging job from the client to the imaging device, the Printer Solution 504 component of the imaging device authenticates the user (3.). Similarly, the client service component 508 on the client device also verifies the user (5.). This authentication and verification is implemented as an authentication backend 506, "pluggable" security provider.

Currently two such providers are supported: 1) a provider integrating with an existing Kerberos infrastructure; and 2) a provider integrating with a plain lightweight directory access protocol (LDAP) authentication solution. For the former, a Kerberos security provider is an industry standard protocol for securely authenticating users and services over a network. Popular implementations include Microsoft Windows (since Windows 2000), the original MIT Kerberos implementation, and Heimdal. With the latter, a username/password is used in the computing environment for user authentication, including integration with a public-key infrastructure (PKI). As is known, the PKI is a system for the creation, storage, and distribution of digital certificates which are used to verify that a particular public key belongs to a certain user. The PKI creates the digital certificates which map public keys to users, securely stores the certificates in a central repository, and revokes them as needed. The PKI system is also available with a smart card implementation, e.g., the user identification card 50, FIG. 1. The smart card can store encrypted digital certificates issued from the PKI provider along with other relevant information of the user of the card. Alternatively, an RFID Security Provider can provide user authentication with a username/password login or as a stand alone technique having user information or credentials stored on an RFID Card. In either case, the provided login information is verified against the user's data in an LDAP server.

When the time comes to actually release an imaging job from the client to the imaging device, the imaging device first requests from the client device an access token to receive the imaging job and, upon presentation of the token, a stream-oriented, secure connection is established between the imaging device and client (6.), especially the printer solution and the client service components. The content of the imaging job is then sent from the Printstore (7.) to the imaging device, by way of the client service. Upon receipt, the imaging device locally decrypts the imaging job and images it, as is known, for hard-copy delivery to the user. It is preferred, but not required, that all data transferred over the network be encrypted by a security provider via a specific encryption schema. If the underlying security mechanism provides robust encryption facilities, these facilities are reused. This is the situation for a Kerberos security provider. In cases where the backing security mechanism does not provide encryption support, a default encryption scheme based on an AES-256 bit cipher is used. The encryption key is negotiated on a per session basis. The default encryption scheme is used by the plain LDAP security provider. In sum, security is provided at different levels: on the client computing device, the imaging jobs are stored encrypted in the local printstore; users are authenticated and authorized via a pluggable Authentication mechanism, namely, smart card based PKI and Username/Password based mechanism exists, backed by a site configured Kerberos or plain LDAP infrastructure; and all network traffic is encrypted.

In more detail, FIGS. 6-8 describe the workflow between devices in the context of secure imaging of media in a print release environment void of print servers having stored imaging jobs. At 602, a user initiates imaging which causes the generation of a unique secret key for that imaging job, 604. At 606, it is determined whether the imaging job is intended for direct imaging at once or whether the imaging occurs later, after claiming by the user at one of many networked imaging devices.

If the latter, the imaging job is encrypted locally 608 and stored locally at the client device 610, such as on a hard disk. Until all incoming data of the imaging job is processed at 612, the process repeats until all such data of the imaging job is encrypted and stored locally. The client then advertises in the active computing directory 614, as before, that imaging jobs exist for the user and the jobs reside on the client in a local database of imaging jobs, 616, until claimed at the imaging device. If claimed, imaged media eventually results from the imaging job at 618.

If the former, at 606, imaging jobs intended for direct processing cause the immediate establishment of a secure connection between the client and the imaging device. Data from the imaging job gets encrypted on-the-fly at 622. The data gets stored locally on the client at 624. Upon the secure connection between the client and the imaging device becoming effected and able to securely transfer data between the two at 626, the encrypted data stored on the client gets immediately sent to the imaging device at 628. Otherwise, the data of the imaging job continues its cyclical processing at 629 of encryption and storage 622, 624 until an entirety of the imaging job gets sent to the imaging device at 628. Upon completion and success of sending the imaging job from the client to the imaging device at 630, the imaging job becomes eventually deleted from the client at 632, as noted in FIG. 3. Otherwise, a failed condition of success at 630 causes the client to advertise the imaging job of the user in the active computing directory 614, as before, and note that the jobs reside on the client in a local database of imaging jobs, 616, until eventually imaged at 618.

With reference to FIG. 7, the user logs in at the imaging device and seeks to claim their imaging job, such as by launching an imaging application 63 (FIG. 1) displayed to the user on a user interface display 61 (FIG. 1). The workflow next depends upon whether the security provided at 704 is configured for RFID or Kerberos implementation, as described above. Upon the user engaging the imaging device with an identification card 50 (FIG. 1), such as in the form of the aforementioned smart card being inserted into a communications slot 55 (FIG. 1) of the imaging device, if the security is based in RFID, the information in the card is checked with the information about the user in the active directory 706. If the security is based on Kerberos, the information in the card is checked with the information stored at the Kerberos service provider, 708. If acceptable, a Kerberos ticket is issued and acquired by the imaging device at 710. At 712, the imaging device is then free to retrieve from the active directory a list of client computing devices having imaging jobs available to the user for processing. A secure connection is then established between the imaging device and all clients reachable at 714. Processing until an imaged media is received by the user occurs as before, beginning with 214, FIG. 2.

With reference to FIG. 8, the imaging device connects to the client service at 802. Depending upon how the security is configured 804, e.g., RFID or Kerberos, the client service checks the information of the user identification card with the information in the active directory 806. Otherwise, the client service checks the Kerberos ticket acquired by the imaging device at 710 (FIG. 7) against the information at the Kerberos service provider 808. If either approach is verified, a secure connection between the client and the imaging device is established at 810. The client sends to the imaging device the list 57 (FIG. 1) of locally stored imaging jobs, including secret keys to decrypt the imaging jobs that are stored encrypted at the client 812. At 814, the imaging device connects to the data port of the client computing device and sends an appropriate token corresponding to the job identifier, 816. In response, the client service sends to the imaging device at 818 the encrypted data corresponding to the imaging job selected by the user for processing at 218 (FIG. 2), for example. The imaging device locally decrypts the encrypted data at 820 and undertakes imaging of media at 822, as before. At 821, all keys are destroyed. The session key is destroyed when the user ends the workflow on the imaging device and the job key is destroyed when the imaging job is submitted successfully to the print engine of the imaging device and the client receives its notice to delete the imaging job. This means the session key is valid from the time of connecting the imaging device to the client until such time as the user finishes their interaction with the imaging solution. The job key, on the other hand, is valid from the time of executing or initiating imaging, such as selecting "File-Print" in a word processing document, for example, until the last byte of the imaging job is successfully transmitted to the print engine of the imaging device and the client receives its notice to delete the imaging job.

Relative advantages of the many embodiments should now be apparent to skilled artisans. They include but are not limited to: Security—1) end-to-end security by Kerberos or 256-bit AES encryption; 2) authentication through Public Key Infrastructure (PKI), RFID, and user identification cards or username/password; 3) remote installation and distribution of a print release environment pushed to clients and imaging devices; 4) secure imaging even in instances of direct imaging; and 5) convenient implementation of entity policy; Cost Savings—1) no hardware or maintenance costs for print and application servers; 2) no server administration, nominally "helpdesk" relief in the case of server malfunctions; and 3) a return on investment in a few months from saving(s) associated with no print server hardware and maintenance which can run thousands of dollars/per each print server; and Infrastructure Optimization—1) no longer are print servers required, which represents a single point of failure; 2) risk of computing device failure is distributed across the client computing devices, as each client computing device serves the role of a print server in a traditional print release environment; and 3) network (e.g., WAN/LAN) traffic is reduced by distributing the workload and bottleneck of print servers to individual client computing device and their communication to imaging devices.

The foregoing illustrates various aspects of the invention. It is not intended to be exhaustive. Rather, it is chosen to provide the best illustration of the principles of the invention and its practical application to enable one of ordinary skill in the art to utilize the invention. All modifications and variations are contemplated within the scope of the invention as determined by the appended claims. Relatively apparent modifications include combining one or more features of various embodiments with features of other embodiments.

The invention claimed is:

1. A method for imaging media in a print release environment having a client computing device and an imaging device connected in a network but without a print server having stored imaging jobs for release to the imaging device from the client computing device for imaging the media, comprising:
   logging in a user to the imaging device for retrieving an imaged media corresponding to an imaging job stored on a local hard disk of said client computing device;
   querying an active computing directory to confirm existence of the imaging job; and
   receiving at the imaging device the imaging job from the local hard disk of the client computing device thereby avoiding receiving the imaging job from any said print server.

2. The method of claim 1, further including contacting the client computing device to receive a list of imaging jobs available to said user of the imaging device, the list including said imaging job stored on the local hard disk of the client computing device.

3. The method of claim 2, further including displaying the list to the user at the imaging device.

4. The method of claim 3, the receiving the imaging job from the local hard disk occurring after the user selects the imaging job from the displayed list.

5. The method of claim 1, further including registering the client computing device with the active computing directory.

6. The method of claim 5, further including un-registering the client computing device from the active computing directory upon no further print jobs remaining for the user of the client computing device.

7. The method of claim 1, further including notifying the client computing device of successfully imaging the imaging job.

8. The method of claim 1, further including deleting the imaging job from the local hard disk of the client computing device.

9. The method of claim 1, further including encrypting the imaging job for storage on the local hard disk of the client computing device.

10. The method of claim 1, further including establishing a secure computing connection between the imaging device and the client computing device before the imaging device receives the imaging job from the local hard disk.

11. The method of claim 10, receiving at the imaging device keys to decrypt the encrypted imaging job.

12. The method of claim 10, further including decrypting the imaging job at the imaging device after the receiving the imaging job from the local hard disk.

13. A method for imaging media in a print release environment having a client computing device and an imaging device connected in a network but without print servers having stored imaging jobs for release to the imaging device from the client computing device for imaging the media, comprising:
   receiving an indication at the imaging device that the client computing device has an imaging job available for imaging the media; and
   upon a user of the imaging job logging in to the imaging device, receiving the imaging job at the imaging device from a local hard drive of the client computing device thereby avoiding receiving the imaging job from any of said print servers.

14. The method of claim 13, further including querying an active computing directory to confirm an existence of the imaging job.

15. The method of claim 13, further including contacting the client computing device to receive a list of imaging jobs available to said user of the imaging device, the list including said imaging job stored on the local hard disk of the client computing device.

16. The method of claim 15, wherein the receiving the imaging job at the imaging device occurs after the user selects the imaging job from the list.

17. A method for imaging media in a print release environment having a client computing device and an imaging device connected in a network but without print servers having stored imaging jobs for release to the imaging device from the client computing device for imaging the media, comprising:
   receiving an indication at the imaging device that the client computing device has an imaging job available for imaging the media;
   upon a user of the imaging job logging in to the imaging device, receiving the imaging job at the imaging device direct from a local hard drive of the client computing device thereby avoiding receiving the imaging job from any of said print servers; and
   receiving at the imaging device one or more keys to decrypt the imaging job received from the client computing device.

18. The method of claim 17, wherein the receiving at the imaging device the one or more keys further includes receiving the one or more keys from the client computing device.

19. The method of claim 17, further including establishing a secure computing connection between the imaging device and the client computing device before the imaging device receives the imaging job from the local hard disk.

20. The method of claim 17, further including destroying the one or more keys after successfully decrypting the imaging job at the imaging device.

* * * * *